(12) United States Patent
Wei et al.

(10) Patent No.: US 9,116,638 B2
(45) Date of Patent: Aug. 25, 2015

(54) METHOD AND APPARATUS FOR READING AND WRITING DATA IN FILE SYSTEM

(71) Applicant: Huawei Technologies Co., Ltd., Shenzhen (CN)

(72) Inventors: Mingchang Wei, Shenzhen (CN); Wei Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 14/025,413

(22) Filed: Sep. 12, 2013

(65) Prior Publication Data

US 2014/0019684 A1    Jan. 16, 2014

Related U.S. Application Data

(63) Continuation of application No. PCT/CN2012/072107, filed on Mar. 9, 2012.

(30) Foreign Application Priority Data

Mar. 14, 2011    (CN) .......................... 2011 1 0060440

(51) Int. Cl.
*G06F 12/00* (2006.01)
*G06F 3/06* (2006.01)
(Continued)

(52) U.S. Cl.
CPC ............ *G06F 3/0689* (2013.01); *G06F 3/0619* (2013.01); *G06F 3/0665* (2013.01);
(Continued)

(58) Field of Classification Search
CPC ................................................. G06F 2212/262
See application file for complete search history.

(56) References Cited

U.S. PATENT DOCUMENTS

| 6,904,498 | B2 * | 6/2005 | Stolowitz | ...................... 711/114 |
| 8,938,583 | B1 * | 1/2015 | Suryabudi | ...................... 711/114 |

(Continued)

FOREIGN PATENT DOCUMENTS

| CN | 1737745 A | 2/2006 |
| CN | 201397674 Y | 2/2010 |

(Continued)

OTHER PUBLICATIONS

Foreign Communication From a Counterpart Application, Chinese Application No. 201110060440.2, Chinese Search Report dated Jul. 31, 2013, 5 pages.

(Continued)

*Primary Examiner* — Gurtej Bansal
(74) *Attorney, Agent, or Firm* — Conley Rose, P.C.; Grant Rodolph

(57) ABSTRACT

Embodiments of the present invention disclose a method and an apparatus for reading and writing data in a file system, which are applicable to the field of communication technologies. In the embodiments of the present invention, the file system supports file-level redundancy algorithm operations of independent disks; after receiving a file read/write request, the file system determines a read/write location of the data to be read/written in the data strip, sequentially caches the to-be-read/written data information corresponding to at least one data strip, and processes the cached data information of at least one data strip. In this way, after the to-be-read/written data information corresponding to a complete data strip is cached, the data is read/written by using a data strip as a unit, and thereby improving efficiency of reading/writing data.

4 Claims, 3 Drawing Sheets

(51) Int. Cl.
*G06F 11/10* (2006.01)
*G06F 12/08* (2006.01)

(52) U.S. Cl.
CPC ........ *G06F11/1076* (2013.01); *G06F 12/0868* (2013.01); *G06F 2211/1009* (2013.01); *G06F 2212/262* (2013.01)

(56) References Cited

U.S. PATENT DOCUMENTS

| | | | |
|---|---|---|---|
| 2003/0074527 | A1 | 4/2003 | Burton et al. |
| 2005/0132212 | A1 | 6/2005 | Haswell |
| 2005/0195843 | A1 | 9/2005 | Ahmed et al. |
| 2007/0266037 | A1 | 11/2007 | Terry et al. |
| 2009/0204846 | A1 | 8/2009 | Baloun et al. |
| 2011/0154105 | A1 * | 6/2011 | Woodhouse ................ 714/6.24 |

FOREIGN PATENT DOCUMENTS

| | | | |
|---|---|---|---|
| CN | 101833422 | A | 9/2010 |
| CN | 101916173 | A | 12/2010 |
| EP | 1400899 | A2 | 3/2004 |
| WO | 2006086379 | A2 | 8/2006 |

OTHER PUBLICATIONS

Foreign Communication From a Counterpart Application, PCT Application No. PCT/CN2012/072107, Chinese Search Report dated Jun. 21, 2012, 6 pages.
Foreign Communication From a Counterpart Application, PCT Application No. PCT/CN2012/072107, English Translation of Chinese Written Opinion dated Jun. 21, 2012, 7 pages.
Foreign Communication From a Counterpart Application, European Application No. 12757914.2, Extended European Search Report dated Feb. 3, 2014, 7 pages.
Siu-Cheung, C., et al., "A Gracefully Degradable Declustered RAID Architecture with near Optimal Maximal Read and Write Parallelism," IEEE International Conference on Cluster Computing, XP010527286, Nov. 28, 2000, pp. 309-318.
Foreign Communication From a Counterpart Application, European Application No. 12757914.2, Extended European Search Report dated Jan. 14, 2015, 5 pages.

* cited by examiner

METHOD AND APPARATUS FOR READING AND WRITING DATA IN FILE SYSTEM

CROSS-REFERENCE TO RELATED APPLICATIONS

This application is a continuation of International Application No. PCT/CN2012/072107, filed on Mar. 9, 2012, which claims priority to Chinese Patent Application No. 201110060440.2, filed on Mar. 14, 2011, both of which are hereby incorporated by reference in their entireties.

FIELD OF THE INVENTION

The present invention relates to the field of communication technologies, and in particular, to a method and an apparatus for reading and writing data in a file system.

BACKGROUND OF THE INVENTION

A file system is a file management system for managing and storing file information. The file system is capable of reading and writing data from and into a redundant array of independent disks (RAID) module by using a virtual block device of a logic unit (LUN). The RAID module may include one or more data storage blocks (marked as RAIDn). Each data storage block includes multiple hard disk drives. The data is stored in the hard disk drives, and carries additional redundant information.

Upon receiving a data read/write request, which is also known as an input/output (I/O) request in the process of reading and writing data, the file system parses the data read/write request, and then stores the request into a corresponding location in the LUN virtual block device; the RAID module reads the data read/write request in the LUN virtual block device, parses the data read/write request, and then processes the requested data by using a RAID data protection method, for example, stores the data into one or more hard disk drives or reads the data from one or more hard disk drives. The RAID data protection method is a method used by the RAID module for reading or writing data and comes in many types, that is, a data protection method of RAIDn (n=1, 2 . . . ). In the prior art, the RAID module stores data by using a data strip as a unit, and each data strip stores multiple data fragments.

In the process of research, the inventor finds that when file data is processed in the prior art, the file system writes the read/write request into the LUN virtual block device, and then the RAID module reads from and writes data into the hard disk drive, which leads to low efficiency of reading and writing data.

SUMMARY OF THE INVENTION

Embodiments of the present invention provide a method and an apparatus for reading and writing data in a file system to improve efficiency of reading and writing data.

An embodiment of the present invention provides a method for reading and writing data in a file system, where the file system supports file-level redundancy algorithm operations of independent disks. The method includes: receiving a file read/write request, and determining locations of the data to be read/written as requested by the file read/write request in a data strip, where the data strip is a data read/write strip of a RAID; sequentially caching, according to determined read/write locations, information about the data to be read/written as requested by the file read/write request corresponding to at least one data strip; and reading data from a corresponding data strip of a hard disk drive according to the cached data information to be read as requested by a file read request corresponding to at least one complete data strip; or, writing, according to the cached data information to be written as requested by a file write request corresponding to at least one complete data strip, the cached data information to be written as requested by the file write request corresponding to the at least one complete data strip into a corresponding data strip of the hard disk drive.

An embodiment of the present invention provides an apparatus for reading and writing data in a file system, where the file system supports file-level redundancy algorithm operations of independent disks. The apparatus includes a request receiving module, a location determining module, a strip caching module, and an operating module.

The request receiving module is configured to receive a file read/write request.

The location determining module is configured to determine locations of the data to be read/written as requested by the file read/write request in a data strip, where the data strip is a data read/write strip of a RAID.

The strip caching module is configured to sequentially cache, according to read/write locations determined by the location determining module, data information to be read/written as requested by the file read/write request corresponding to at least one data strip.

The operating module is configured to read data from a corresponding data strip of a hard disk drive according to the cached data information to be read as requested by a file read request corresponding to at least one complete data strip; or, according to the cached data information to be written as requested by a file write request corresponding to at least one complete data strip, write the cached data information to be written as requested by the file write request corresponding to the at least one complete data strip into a corresponding data strip of the hard disk drive.

In the embodiments of the present invention, the file system supports file-level redundancy algorithm operations of independent disks; after receiving a file read/write request, the file system determines the read/write locations of the data to be read/written in the data strip, sequentially caches the to-be-read/written data information corresponding to at least one data strip, and processes the cached data information of at least one complete data strip. In this way, after the to-be-read/written data information corresponding to a complete data strip is cached, the data is read/written by using a data strip as a unit, and it is not necessary to write the file read/write request into the LUN virtual block device first and then use the RAID module to access the hard disk drive whenever the file read/write request is received, thereby improving efficiency of reading/writing data.

Moreover, according to the method in the embodiments of the present invention, the file system and the RAID module do not need to parse the file operation request respectively, and further the RAID module does not need to perform file operations in the hard disk drives. Instead, the file system uses a RAID data protection algorithm to cache data information into data strips, and accesses the hard disk drive directly, thereby improving reliability of data storage and simplifying the file processing.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. The accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. The embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
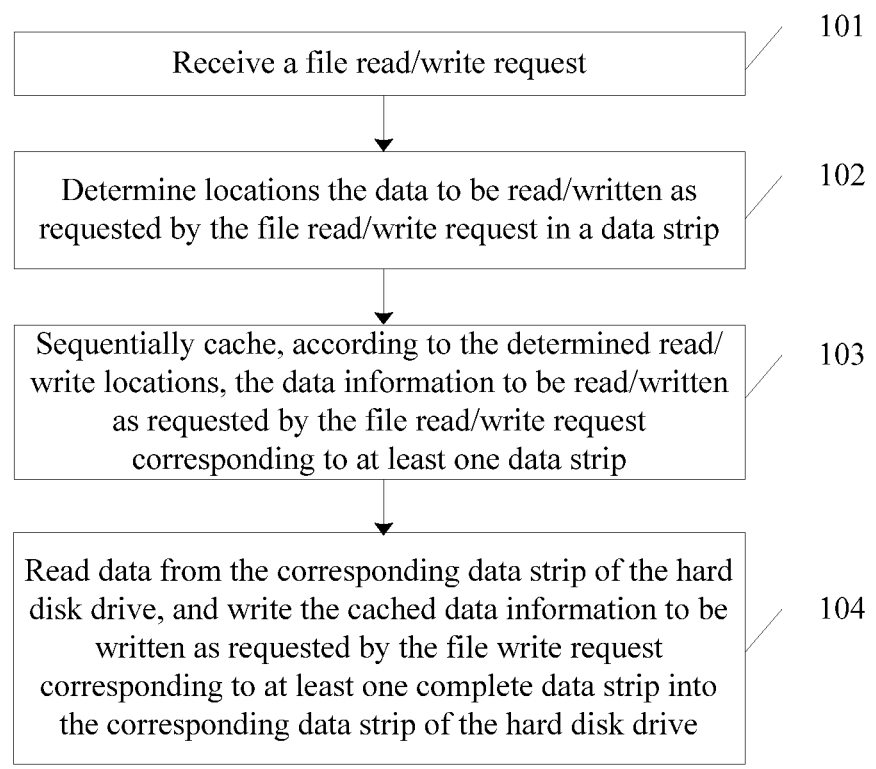
FIG. 1 is a flowchart of a method for reading and writing data in a file system according to an embodiment of the present invention.

An embodiment of the present invention provides a method for reading and writing data in a file system. The file operation method in this embodiment of the present invention is a method executed by the file system. As shown in FIG. 1, the method includes:

101. Receive a file read/write request, where the file read/write request is an I/O request.

102. Determine locations of the data to be read/written as requested by the file read/write request in a data strip, where the data strip is a data read/write strip of a RAID.

In this embodiment, the file system supports the file-level redundancy algorithm operations of independent disks. For example, the file system may store a single file in a distributed way according to the RAID strips. That is, the data in the file system is stored in multiple hard disk drives in the form of data strips, and the file system performs file operations for the hard disk drives directly, for example, writes data into or reads data from the hard disk drives directly. The hard disk drive here may be any non-volatile storage medium such as a traditional hard disk, a solid-state hard disk, a magnetic tape, or an erasable compact disc.

In this embodiment, the file system may use any traditional type of RAID data protection method, namely, RAIDn (n=1, 2 . . . ) data protection method, to perform file operations on one or more hard disk drives, where RAIDn is a data storage block. Each data storage block may have a different type of data protection method. For example, RAID1 is a multi-mirroring redundant protection method for data, RAID5 stores data into data strips, and any data fragment in each data strip may be calculated through the check block and other data fragments in the data strip. The data fragments in a data strip are stored in different hard disk drives.

The data strip is a unit for storing data by using specific types of RAID data protection algorithms. One data strip may include multiple data fragments. Each file read/write request includes location information about the to-be-read/written data. More specifically, the location information may comprise offset locations of the to-be-read/written data relative to initially stored data. The file system may determine the read/write locations of the to-be-read/written data in the data strip according to the location information, or to the offset location. The read/write locations may be specific fragments in the data strip, or specific hard disk drives, and so on.

Understandably, a single-disk file system may be set on each hard disk drive, at least two fragment files are created on the single-disk file system, and file data may be distributed into the fragment files. The file data corresponding to one file read/write request may be distributed into fragment files of a single-disk file system on at least two hard disk drives to form a RAID data protection relationship.

103. Sequentially cache, according to the determined read/write locations, information about the data to be read/written as requested by the file read/write request corresponding to at least one data strip.

If a file write request is received, the data to be written as requested by the file write request corresponding to at least one data strip is cached; and if a file read request is received, the information about the data to be read as requested by the file read request corresponding to at least one data strip is cached.

Understandably, if the data to be read/written as requested by a file read/write request is not enough for fully occupying a data strip, it may wait for receiving other file read/write requests until the data to be read/written as requested by the received read/write requests occupies a data strip fully. Then step 104 is performed. For example, a data strip stores up to seven data fragments, but the data to be read/written as requested by a received file read/write request forms four data fragments. Therefore, the file system needs to wait for other file read/write requests until the data to be read/written as requested by other file read/write requests forms the other three data fragments. Then step 104 is performed.

If the data to be read/written as requested by a file read/write request exceeds the storage space of a data strip, step 104 is performed whenever the to-be-read/written data occupies a data strip fully and continues to cache the remaining information about the data to be read/written as requested by the file read/write request, which is stored outside the data strip. For example, a data strip stores up to four data fragments, but the data to be read/written as requested by a received file read/write request forms seven data fragments. Therefore, the file system performs step 104 after caching four data fragments sequentially, and continues caching the information about the data of the other three fragments to be read/written as requested by the file read/write request.

In this embodiment, the to-be-read/written information about the data corresponding to multiple data strips may be cached simultaneously.

104. Read data from a corresponding data strip of hard disk drives according to the cached information about the data to be read as requested by a file read request corresponding to at least one complete data strip; or, according to the cached information about the data to be written as requested by a file write request corresponding to at least one complete data strip, write the cached information about the data to be written as requested by the file write request corresponding to the at least one complete data strip into a corresponding data strip of disk drives.

It should be noted that when the file system performs steps 103-104, the file system performs the steps sequentially for a same data strip, but performs the steps concurrently for different data strips. That is, while caching the information about the data corresponding to a data strip, the file system may perform corresponding read/write operations for the information about the data corresponding to other cached data strips.

In this embodiment, the file system accesses the hard disk drive and reads/writes data only after caching a complete data strip. Evidently, the file system accesses the hard disk drive by using a data strip rather than a file read/write request as a unit. Because a data strip is a storage location of data in the hard disk drive, such a practice improves efficiency of reading/writing data in the file system.

In this embodiment of the present invention, the file system supports file-level redundancy algorithm operations of independent disks; after receiving a file read/write request, the file system determines the read/write locations of the data to be read/written in the data strip, sequentially caches the to-be-read/written information about the data corresponding to at least one data strip, and processes the cached information about the data of at least one complete data strip. In this way, after the to-be-read/written information about the data corresponding to a complete data strip is cached, the data is read/written by using a data strip as a unit, and it is not necessary to write the file read/write request into the LUN virtual block device first and then use the RAID module to access the hard disk drive whenever the file read/write request is received, thereby improving efficiency of reading/writing data.

Moreover, according to the method in the embodiments of the present invention, the file system and the RAID module do not need to parse the file operation request respectively, and further the RAID module does not need to perform file operations on hard disk drives. Instead, the file system uses a RAID data protection algorithm to cache information about the data into data strips, and accesses hard disk drives directly, thereby improving reliability of data storage and simplifying the file processing.

In a specific embodiment, after the file system receives the file read/write request in step 101, the file system may determine the type of file to be read/written as requested by the file read/write request first, and perform step 102 if the file type is file data, namely, content data of the file.

If the file type is file metadata, namely, attribute data such as file format and file size in the file system, the file system may read file metadata in any hard disk drive that stores the file metadata, or back up the file metadata into multiple copies and store them into at least two hard disk drives according to a multi-mirroring redundancy algorithm.

The file system in this embodiment applies a different method to each different file type. For example, for data of an important file type (such as file metadata), the file system may use a multi-mirroring redundancy algorithm of RAID1; for data of certain types (such as file data), the file system may use a protection method such as RAID5 and RAID6 as required by the application scenario, and operate data in hard disk drives in the form of data strips. The specific RAID algorithm may be determined according to a preset policy.

In this way, in the file read/write operations, the data of important file types may be protected primarily. For example, important data is written into at least two hard disk drives in the system, thereby improving reliability of data storage.

To further ensure data reliability, when the file system receives a synchronization (sync) operation instruction, a flush operation instruction, or a close operation instruction, and so on, if the information about the data currently being cached does not occupy a data strip fully, the file system also needs to perform the operation of writing data in step 104, that is, write the information about the data corresponding to the currently cached data strip in step 103 into the corresponding data strip. In this way, it is ensured that all information about the data is backed up into one or more hard disk drives before the operation such as synchronizing, flushing or closing a file is performed.

In this embodiment of the present invention, the file system uses a data strip as a unit to cache the data written in a hard disk drive first; if the cached data in the data strip needs to be read before the cached data is written into the hard disk drive, to ensure timely and accurate reading of data. In another specific embodiment, if a file read request is received in step 101 before reading data in step 104, the file system needs to determine whether the cached information about the data, which is to be read as requested by the file read request corresponding to at least one complete data strip, is stored in other currently cached data strips of the file system. If yes, the file system reads the corresponding data from the currently cached data strip of the file system; and if no, the file system reads the data from the corresponding data strip of the hard disk drive.

It should be noted that in other specific embodiments, if the system receives a file write request, the system may start counting time at the beginning of caching the information about the data corresponding to a data strip, and when the counted time reaches a preset duration but the information about the data corresponding to a complete data strip is not fully cached, the system may write the information about the data, corresponding to the data strip that is not fully cached currently, into the corresponding data strip. This avoids the failure of writing the file into the hard disk drive when the time of caching the information about the data corresponding to a complete data strip is too long.

Figure 2:
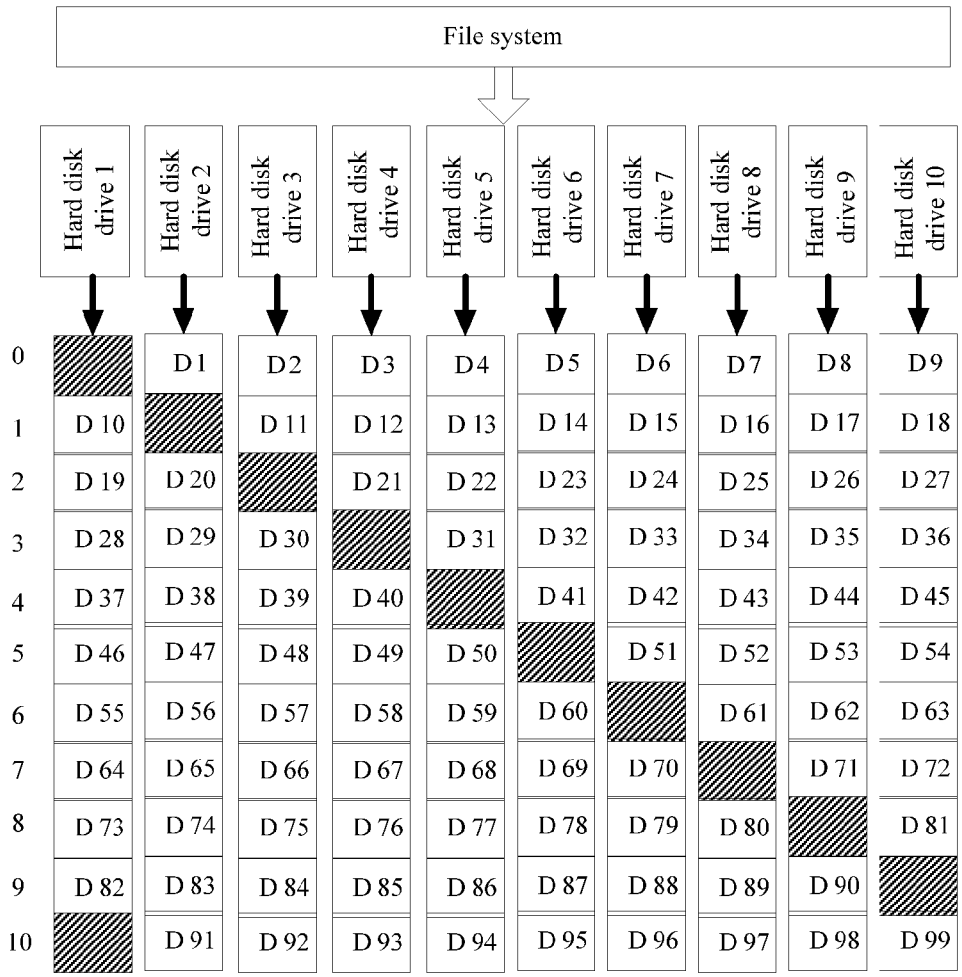
FIG. 2 is a schematic structural diagram of a method for reading and writing data in a file system according to an embodiment of the present invention.

The following gives description with reference to a specific embodiment. As shown in FIG. 2, the data is stored into 10 hard disk drives; each hard disk drive has multiple data fragments. FIG. 2 illustrates only 11 data fragments on the hard disk drives; the part filled with oblique lines stores a check block P, and each file data strip includes nine horizontally distributed data fragments and 1 check block P.

If the file system receives a file read request and it is determined that the locations of the data to be read as requested by the file read request are hard disk drives 1, 2, 4, and 5 in the second data strip, the file system sequentially caches the information about the data to be read as requested by the file read request corresponding to the data strip. Because the to-be-read data does not fully occupy the space of the nine data fragments in the data strip, the file system waits for another file read request until the data to be read as requested by other file read requests is the other five data fragments, whereupon the file system reads data in the second data strip of the hard disk drive according to the cached information about the data corresponding to the data strip.

If the file system receives a file write request and it is determined that the locations of the data to be written as requested by the file write request are hard disk drives 1-4 in the third data strip and the fourth data strip, the file system sequentially caches the data to be written as requested by the file write request corresponding to the data strips. Because the to-be-read data exceeds the space of the nine data fragments in the data strip, the file system writes the cached data corresponding to a data strip into the third data strip of the hard disk drive first, and waits for another file write request until the data to be written as requested by other file write requests forms other five data fragments, whereupon the file system writes data corresponding to the fourth data strip.

Figure 3:
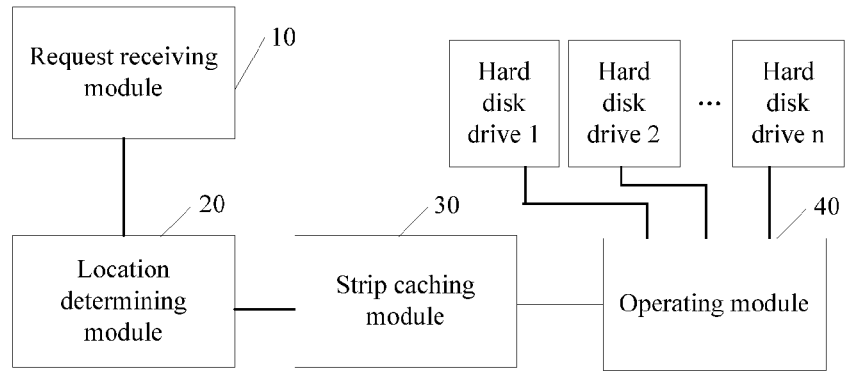
FIG. 3 is a schematic structural diagram of an apparatus for reading and writing data in a file system according to an embodiment of the present invention.

An embodiment of the present invention provides an apparatus for reading and writing data in a file system, where the file system supports file-level redundancy algorithm operations of independent disks. The structure of the apparatus in this embodiment is shown in FIG. 3, and the apparatus includes a request receiving module 10, a location determining module 20, a strip caching module 30, and an operating module 40.

The request receiving module 10 is configured to receive a file read/write request.

The location determining module 20 is configured to determine locations of the data to be read/written as requested by the file read/write request received by the request receiving module 10 in a data strip, where the data strip is a data read/write strip of a RAID.

The strip caching module 30 is configured to sequentially cache, according to read/write locations determined by the location determining module 20, information about the data to be read/written as requested by the file read/write request corresponding to at least one data strip.

The operating module 40 is configured to read data from a corresponding data strip of a hard disk drive according to the information about the data to be read as requested by a file read request corresponding to at least one complete data strip, where the information about the data is cached by the strip caching module 30; or, according to the cached information about the data to be written as requested by a file write request corresponding to at least one complete data strip, write the cached information about the data to be written as requested by the file write request corresponding to the at least one complete data strip into a corresponding data strip of the hard disk drive.

Figure 4:
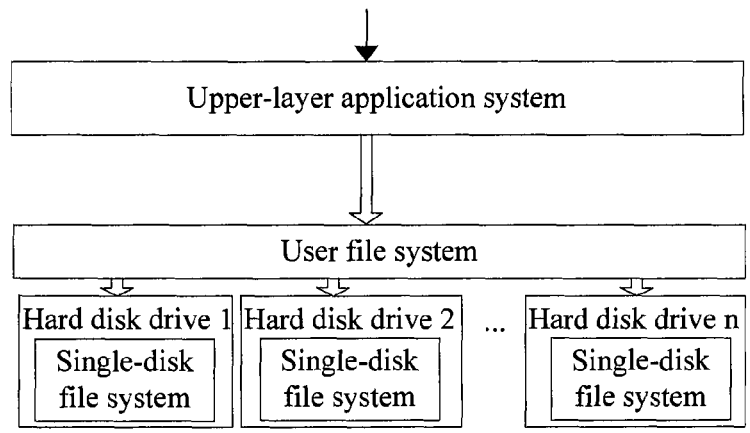
FIG. 4 is a schematic structural diagram of the relationship between a file system and an upper-layer application system according to an embodiment of the present invention.

As shown in FIG. 4, the apparatus in this embodiment of the present invention may be an apparatus for operating files while the device executes an application program. The apparatus may include a user file system, and perform data operations in hard disk drives. Each hard disk drive includes a single-disk file system. The upper-layer application system is a user-oriented interface. After receiving a file read/write request, the upper-layer application system sends the request to the user file system, and the user file system accesses the hard disk drive directly by using a RAID data protection method, and therefore, the files are distributed in the fragment files in a single-disk file system on multiple hard disk drives to form a RAID protection relationship.

In the apparatus according to this embodiment of the present invention, after the receiving module 10 receives the file read/write request, the location determining module 20 determines the read/write locations of the to-be-read/written data in the data strip, the strip caching module 30 sequentially caches the to-be-read/written information about the data corresponding to at least one data strip, and the operating module 40 processes the cached information about the data of at least one complete data strip. In this way, after the to-be-read/written information about the data corresponding to a complete data strip is cached, the data is read/written by using a data strip as a unit, and it is not necessary to write the file read/write request into the LUN virtual block device first and then use the RAID module to access the hard disk drive whenever the file read/write request is received, thereby improving efficiency of reading/writing data.

Moreover, according to the method in the embodiments of the present invention, the file system and the RAID module do not need to parse the file operation request respectively, and further the RAID module does not need to perform file operations in the hard disk drives. Instead, the file system uses a RAID data protection algorithm to cache information about the data into data strips, and accesses the hard disk drive directly, thereby improving reliability of data storage and simplifying the file processing.

Figure 5:
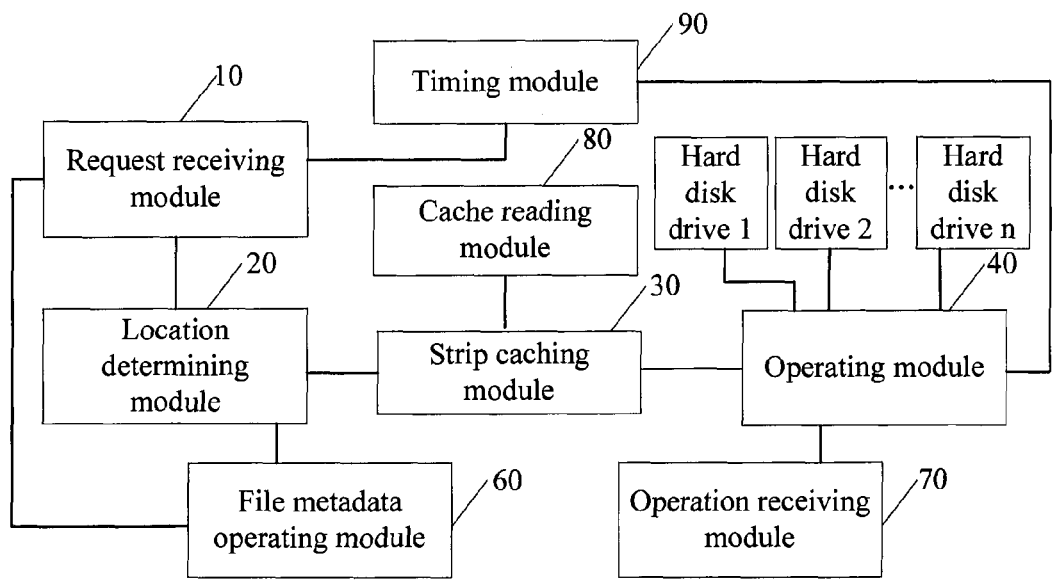
FIG. 5 is a schematic structural diagram of another apparatus for reading and writing data in a file system according to an embodiment of the present invention.

As shown in FIG. 5, in a specific embodiment, the apparatus for reading and writing data in a file system may further include a file metadata operating module 60 and an operation receiving module 70.

The file metadata operating module 60 is configured to, if the type of the file to be read/written as requested by the file read/write request received by the request receiving module 10 is file metadata: when a file read request is received, read file metadata in any hard disk drive that stores the file metadata; or when a file write request is received, back up the file metadata into multiple copies and store them into at least two hard disk drives according to a multi-mirroring redundancy algorithm.

The operation receiving module 70 is configured to receive a sync operation instruction, a flush operation instruction, or a close operation instruction.

In the apparatus according to this embodiment, after the request receiving module 10 receives the file read/write request, if the type of the requested file to be read/written is file data, the location determining module 20 determines read/write locations in the data strip; and if the file type is file metadata, the file metadata operating module 60 reads file metadata in any hard disk drive that stores the file metadata, or backs up the file metadata into multiple copies and stores them into at least two hard disk drives according to a multi-mirroring redundancy algorithm. In this way, in the file read/write operations, the data of important file types may be primarily protected. For example, important data is written into at least two hard disk drives, thereby improving reliability of data storage.

To further ensure data reliability, when the operation receiving module 70 receives an operation instruction such as a sync operation instruction, a flush operation, or a close operation, the operating module 40 writes the information about the data corresponding to the data strip currently cached by the strip caching module 30 into the corresponding data strip of the hard disk drive. This ensures that all information about the data is backed up into the hard disk drive before the operation instruction such as synchronizing, flushing or closing a file is performed.

As shown in FIG. 5, in another specific embodiment, the apparatus for reading and writing data in a file system may further include a cache reading module 80 and a timing module 90.

The cache reading module 80 is configured to determine whether the information about the data cached by the strip caching module 30 to be read as requested by the file read request corresponding to at least one complete data strip is stored in other data strips cached currently; if yes, read the corresponding data from the currently cached data strip; and if no, instruct the operating module 40 to read data from the corresponding data strip of the hard disk drive.

The timing module 90 is configured to when the time spent in caching the to-be-written information about the data corresponding to a complete data strip exceeds a preset duration, send a write operation instruction to the operating module 40 as an instruction of writing the information about the data corresponding to the currently cached, but not fully cached, data strip into the data strip of the hard disk drive.

In this way, when the request receiving module 10 receives a file read request, before the operating module 40 reads or writes data, the cache reading module 80 determines whether the to-be-read information about the data is stored in other data strips cached by the strip caching module 30; if yes, reads data from other data strips; and if no, instructs the operating module 40 to read data from the hard disk drive.

If the request receiving module 10 receives a file write request, the timing module 90 may start counting time at the beginning of caching the information about the data corresponding to a data strip, and, when the counted time reaches a preset duration but the information about the data corresponding to a complete data strip is not fully cached, instruct the operating module 40 to write the information about the data corresponding to the data strip that is not fully cached currently into the corresponding data strip. This avoids the failure of writing the file into the hard disk drive when caching the information about the data corresponding to a complete data strip takes long.

Persons of ordinary skill in the art may understand that all or a part of the steps of the methods according to the embodiments may be implemented by a program instructing relevant hardware. The program may be stored in a computer readable storage medium, which may be a read only memory (ROM), a random access memory (RAM), a magnetic disk, or a compact disc (CD)-ROM.

A method and an apparatus for reading and writing data in a file system that are provided in the embodiments of the present invention are introduced in detail in the foregoing. In this specification, specific examples are used to describe the principles and implementation manners of the present invention. The foregoing descriptions of the embodiments are merely used to help understand the method and core idea of the present invention. Meanwhile, persons of ordinary skill in the art can make modifications to the specific implementation manners and application scopes according to the idea of the present invention. In conclusion, the content of the specification should not be construed as a limitation to the present invention.

What is claimed is:

1. A method for reading data in a file system of one or more computers that are configured to manage and store file information, the method comprising:
    receiving a file read request;
    determining a data strip storing at least some of data to be read according to the file read request, wherein the data strip is a unit for storing multiple data fragments in a Redundant Array of Independent Disks (RAID) module, and wherein the data fragments in the data strip are stored in multiple hard disk drives;
    caching information about the at least some of the data to be read;
    determining that the at least some of the data to be read fully occupies the data strip; and
    based upon the determination that at least some of the data to be read fully occupies the data strip, reading the at least some of the data from the data strip according to the information about the data.

2. The method according to claim 1, wherein the file read request includes location information about the data to be read, and wherein the data strip storing the at least some of the data to be read is determined according to the location information about the data to be read.

3. A computer program product comprising a computer readable medium having stored thereon computer executable instructions that when executed implement the following steps to read data in the file system of one or more computers that are configured to manage and store file information:
    receiving a file read request;
    determining a data strip storing at least some of data to be read according to the file read request, wherein the data strip is a unit for storing multiple data fragments in a Redundant Array of Independent Disks (RAID) module, and wherein the data fragments in the data strip are stored in multiple hard disk drives;
    caching information about the at least some of the data to be read;
    determining that the at least some of the data to be read fully occupies the data strip; and
    based upon the determination that at least some of the data to be read fully occupies the data strip, reading the at least some of the data from the data strip according to the information about the data.

4. The computer program product according to claim 3, wherein the file read request includes location information about the data to be read, and wherein the data strip storing the at least some of the data to be read is determined according to the location information about the data to be read.

* * * * *